Nov. 11, 1930.   G. CELAYA   1,781,215
MACHINE FOR HUSKING COCONUTS
Filed Dec. 17, 1929
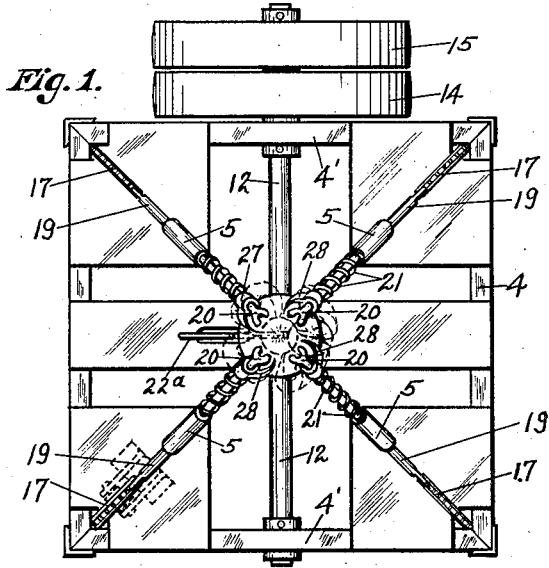
Fig. 1.
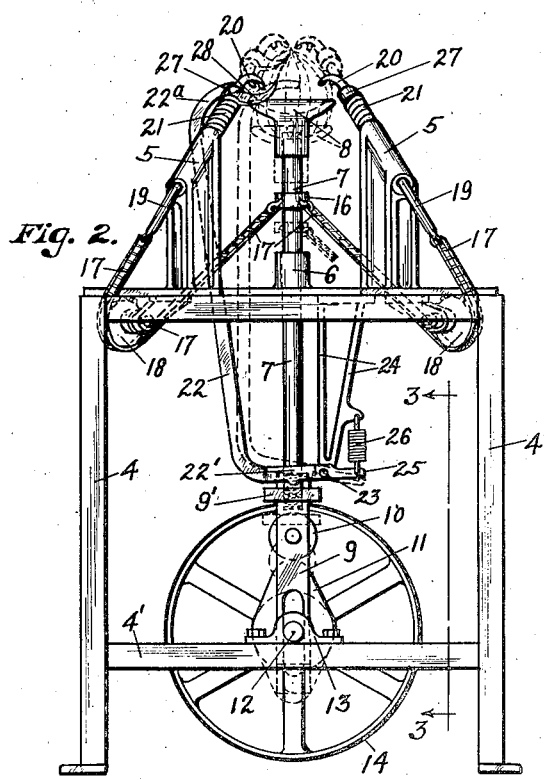
Fig. 2.
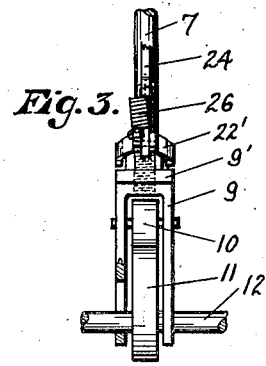
Fig. 3.
INVENTOR
Genaro Celaya
BY
ATTORNEY Patented Nov. 11, 1930

1,781,215

UNITED STATES PATENT OFFICE

GENARO CELAYA, OF LOS ANGELES, CALIFORNIA

MACHINE FOR HUSKING COCONUTS

Application filed December 17, 1929. Serial No. 414,772.

My invention relates to machines for husking coconuts, and has among its salient objects to provide a machine by means of which the husks of coconuts can be quickly and easily removed from the coconuts and with a minimum of manual effort.

Another object of my invention is to provide a machine in which there is a double movement or operation involved, that is, the coconut is held and moved in one direction while the cutting and pulling mechanism is moved in an opposite direction, which results in cutting and pulling the husk in one direction while the coconut is being forced in the opposite direction.

Another object of my invention is to provide a machine in which the husk is cut or slashed in four places and is then pulled in four different segments as the coconut is forced in the opposite direction.

Other objects and advantages of my invention will be pointed out in connection with the following description of one practical embodiment of the invention, taken in connection with the accompanying sheet of drawings in which:

Figure 1 is a top plan view of a machine embodying my invention;

Figure 2 is an end elevation thereof; and

Figure 3 is a fragmentary detail taken on line 3—3 of Fig. 2.

Referring more in detail to the drawings, the invention as here embodied comprises a supporting frame or structure, designated 4, 4, having four bearing brackets, 5, 5, 5, 5 mounted on the top thereof, and a central bearing 6, through which is a vertical shaft 7, carrying at its upper end a cup or receiving member 8, into which the coconut is placed. At its lower end, said shaft is provided with a fork 9, with a cam roller 10, mounted therein and positioned to be engaged and moved by a revolving cam element 11, mounted on a shaft 12, supported in bearings 13, in cross frame members 4′, 4′, and provided on its outer end with two pulleys 14 and 15, for driving said shaft from any suitable source of power.

A collar 16 is shown secured to said shaft 7, below the cup 8, to which is attached four chains 17, 17, 17, 17, which extend down through the top and upwardly around four pulleys or sprockets, designated 18, 18, and at their upper ends are attached to four rods, 19, 19, 19, 19, working through the bearing brackets 5, 5, 5, 5, as clearly illustrated. The upper ends of said rods are provided with four claws or hooks, designated 20, 20, with coiled springs 21, 21, 21, 21, on the upper ends of said rods, between the hooks and the brackets for normally moving said hooks and rods upwardly, and through the chains pulling said rod 7 downwardly as the cam element 11 moves downwardly.

On the upper end of the fork 9 is a plate or head 9′, upon which rests the angle portion 22′ of a discharging rod or bar 22 which is extended upwardly to the cup location and turned into a discharge finger 22ᵃ. The angle end 22′ of said bar is pivotally supported at 23, in a suspended bracket 24, from the top of the structure 4, 4. The angle end 22′ of said bar has an extension finger 25, with a coiled spring 26 attached thereto and to the bracket 24 above, as shown, for normally holding said discharge bar or member in its normal position, as shown in full lines. Said discharge bar is moved by the plate 9′, on the fork 9, when the latter is raised by means of the cam 11, as indicated in light broken lines in Fig. 2.

It will thus be seen that as the vertical shaft 7 and the receiving cup 8 are moved upwardly, the four hooks or claws 20, 20, are pulled downwardly through the bearing brackets 5, 5. Mounted on the upper ends of said hooks or claws, are four collars 27, 27, 27, 27, carrying four knives 28, 28, 28, 28, positioned to cut or slash the husk of a coconut in the cup 8, as said coconut is forced upwardly by the shaft 7, cutting it in four different places and severing the husk into four segments just enough so that the claws or hooks 20, 20, can start the husk and pull it from the coconut sufficiently so that the coconut can be pushed or discharged therefrom when the hooks reach their down position and the coconut and cup 8 are in their uppermost position, as indicated in light broken lines in Fig. 2.

The coconuts are placed in the cup 8 while said cup is down and the hooks are up, and the parts are all so positioned and timed in their movements that the coconut is forced upwardly as the knives are forced downwardly, followed by the hooks or claws which pull the segments of the husk from the coconut as the coconut is forced upwardly to its uppermost position before being pushed from the cup. The husk is removed by hand from the cup as the cup descends and another coconut is placed therein.

I do not limit my invention to the details of construction and arrangement shown for illustrative purposes, except as I may be limited by the hereto appended claims.

I claim:

1. In a machine of the character referred to, a supporting structure, a receiving cup for the article, means for moving said receiving cup in one direction, knives positioned to slash said article in said cup as said article is moved along said knives, hook members movably mounted to catch into said article between the slashes made by said knives, and operating connections for moving said hook members in the opposite direction to that of said article, whereby to pull from said article the slashed outside thereof.

2. In a machine of the character referred to, means for holding an article, a plurality of knives for slashing said article, hook members for catching and pulling the slashed outside of said article therefrom, and operating connections between said article holding means and said hook members for moving them in opposite directions whereby the article is forced in one direction and its outside is pulled therefrom in the opposite direction.

3. Means for husking coconuts including means for holding a coconut, a plurality of knives positioned to slash the outside of said coconut into segments, hook members positioned to catch said segments and to pull them from said coconut, and operating connections for simultaneously forcing said coconut holding means in one direction and said hook members in the opposite direction, whereby the slashed husk is pulled from said coconut.

4. Means for husking coconuts including means for holding a coconut, a plurality of knives positioned to slash the outside of said coconut into segments, hook members positioned to catch said segments and to pull them from said coconut, said coconut holding means and said hooks being operatively connected together whereby the movement of the coconut holding means in one direction moves said hooks in the opposite direction, and operating means for moving said coconut holding means.

5. A coconut husking machine including in combination, a holder for coconuts, said holder being movably mounted, a series of hook members movably mounted to overlie said coconut holder, operating connections for moving said holder and said hook members in opposite directions with the coconut therebetween, a series of knives positioned to slash a coconut in said holder as it is forced along said knives, and means for intermittently actuating said holder in one direction and said hook members in the opposite direction, and means for discharging the coconut from said holder.

6. A machine for husking coconuts including in combination, a supporting structure, a vertical shaft therein, means for intermittently moving the same upwardly, a receiving and holding cup at its upper end to receive coconuts, four supporting brackets, four hook members movably mounted in said brackets, operating connections from said hook members to said shaft to cause them to be moved in opposite directions, four knives positioned to slash a coconut in said holder cup as it is forced upwardly, said hook members being positioned to catch and pull a slashed husk in four segments from a coconut in said cup as said cup is forced upwardly and said hooks are forced downwardly, and power means for operating said shaft.

7. A machine for husking coconuts including in combination, a supporting structure, a shaft reciprocating therein, means for moving said shaft lengthwise, a holding cup on the end of said shaft to receive a coconut with husk, a series of knives positioned in the path of movement of said cup and adapted to slash the husk of a coconut as it is forced along said knives, supporting brackets on said structure, a series of hook members movably mounted in said brackets with their hooks positioned in the path of movement of said coconut, means for moving said hooks simultaneously in one direction and into pulling engagement with said coconut husk as said coconut is moved in the opposite direction, and means for discharging said coconut from said husk and cup.

8. In a machine for husking coconuts, in combination, means for holding and moving a coconut with husk in one direction, cutter knives in the path of movement to slash said husk as said coconut is forced along said knives, hooks movable in the opposite direction and positioned to catch and pull the segments of said husk between the slashes by said knives, and power means for simultaneously moving said holding means for the coconut and said hooks in opposite directions and related to each other to pull the husk segments in one direction and force the coconut in the opposite direction.

9. In a machine for husking coconuts, in combination, means for holding a coconut and husk, cutter knives positioned around said holder, power means for forcing said holding means and coconut along said knives, hooks movably mounted over said holding means and movable in the opposite direction, power means for moving the same simultaneously with the movement of said holding means, whereby to force said holding means in one direction and said hooks in the opposite direction for stripping said husk from said coconut, and means for discharging said coconut from said husk and holding means.

Signed at Los Angeles, Los Angeles County, California, this 12th day of December, 1929.

GENARO CELAYA.